March 25, 1947.　　　T. BARISH　　　2,417,856
DISC BRAKE
Filed March 1, 1946　　　2 Sheets-Sheet 1
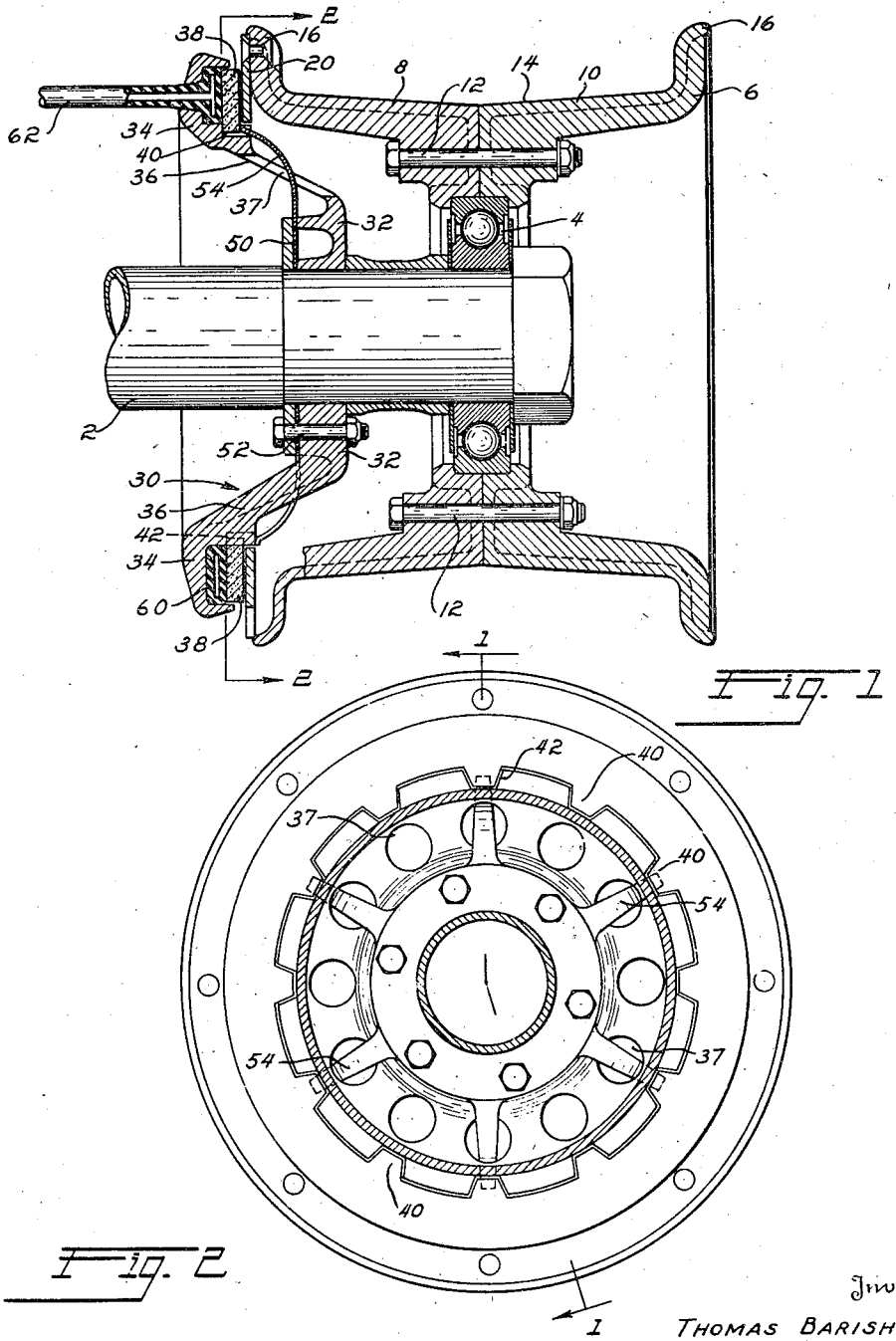
Inventor
THOMAS BARISH
By Scrivener & Parker
Attorneys March 25, 1947.  T. BARISH  2,417,856
DISC BRAKE
Filed March 1, 1946  2 Sheets-Sheet 2

Inventor
THOMAS BARISH

By Scrivener & Parker
Attorneys

Patented Mar. 25, 1947

2,417,856

UNITED STATES PATENT OFFICE 2,417,856

DISC BRAKE

Thomas Barish, Cheverly, Md., assignor to Engineering and Research Corporation, Riverdale, Md., a corporation of Maryland Application March 1, 1946, Serial No. 651,296

6 Claims. (Cl. 188—71)

1

This invention relates to brakes and, more particularly, to disc brakes. Such braking devices comprise a disc connected to the wheel and rotatable therewith, a non-rotatable disc positioned adjacent and parallel to the wheel-connected disc, and some means, which may be hydraulic or mechanical in operation, for moving one or both of the discs into braking engagement with each other.

In a specific type of such braking devices the rotatable braking disc is rigidly attached to the wheel and the non-rotatable disc is moved into engagement therewith in order to effect the braking action. My invention relates particularly to brakes of this type and it is, and has been, one of the principal objects of the invention to provide a braking device of this type in which the so-called fixed braking member, which may be moved axially into braking engagement with the rotatable brake disc, is floatingly supported in such a manner that no special supporting member or structure is required to hold it in either its normal or operating positions. In this connection, it has been an object of the invention to floatingly support the fixed braking disc solely by means of the retracting spring which must be provided in order to urge it out of engagement with the rotatable disc.

Another of the realized objects of the invention has been to provide a braking device of the described type which is of new, improved and simplified structure and operation, utilizing a minimum number of parts which are simple and inexpensive in construction and which may be easily and quickly assembled and disassembled.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a cross-sectional view through an airplane wheel and brake assembly including the new and improved braking means provided by the invention taken on line 1—1 of Fig. 2;

Fig. 2 is a sectional view taken on line 2—2 of Fig. 1;

Figure 3:
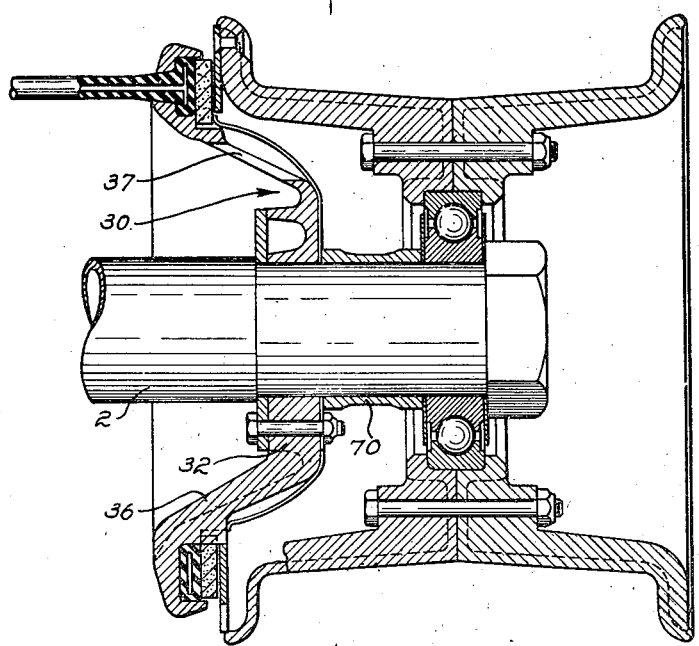
Fig. 3 is a view which is similar to Fig. 1 but shows a modified form of the invention, taken on line 3—3 of Fig. 4.

A brake according to one form of my invention is disclosed in Figs. 1 and 2 of the drawings in association with a wheel assembly comprising a fixed axle 2 on which, adjacent the outer end thereof, is keyed the inner race of a bearing 4 having a single row of balls. The outer race of the bearing is attached centrally of the web of a wheel 6 which is formed in two substantially identical cylindrical parts 8, 10, the abutting faces of which are co-planar with the centers of the balls of bearing 4. The two halves of the wheel are connected by an annular series of bolts 12 which extend through the web of the wheel. The two parts of the wheel provide a generally cylindrical tire-receiving rim 14 having axially-spaced tire-retaining flanges 16.

This invention provides novel means for stopping rotation of the wheel and such means comprise an annular disc 20 which is rigidly attached, as by rivets, to the outer face of one of the tire-retaining flanges 16. A device for supporting a brake actuator and a fixed friction disc is also provided by the invention and comprises a cast or sheet metal member denoted generally by numeral 30 and having an inner part 32 which surrounds and is rigidly attached to axle 2 and extends radially thereof, and an outer part 34 of C-shaped cross-section which is integrally connected to the central part by a conical part 36 which is provided with an annular series of apertures 37. The C-shaped part 34 is at approximately the same radial position as the wheel-carried braking member 20, has approximately the same radial extent and the open side of such C-shaped part faces the braking member 20 and is spaced axially outwardly therefrom. A disc 38, which is formed of friction material, is positioned over the open face of the C-shaped part and is provided with an annular series of fingers 40 which extend radially inwardly from the inner peripheral edge of the disc 38 and extend respectively into an annular series of apertures 42 formed in the annular, lower axially-extending arm of the C-shaped supporting device 34. The apertures 42 have such axial extent that the disc 38 may be moved axially into and out of braking engagement with the wheel-supported disc 20.

Means are provided by the invention for retaining the fixed disc 40 in the described position and arrangement without the aid of structural supporting means, while permitting the disc to be moved into braking engagement with the rotating disc 20. Such means comprise a spring device having a flat annular central part 50, which surrounds and extends radially of the axle and is fixed to the inner part 32 of the brake support 30 by bolts 52, and a plurality of fingers 54 extending outwardly from such central part. In the disclosed embodiment each of the spring fingers extends through one of the apertures 37 in the conical member 36 and is so formed that its extreme outer end bears against the fixed braking disc 38, constantly urging it in a direction away from the rotatable braking disc 20. Preferably, each of the spring fingers engages one of the fingers 40 which extend inwardly from the inner periphery of the brake disc 38.

An annular expansible, hollow tube 60 is disposed within the C-shaped part 34 of the supporting device 30 and is connected through conduit 62 to a source of fluid pressure. The tube abuts the outer face of disc 38 whereby the same is moved axially toward the wheel-carried disc upon expansion of the tube.

Figure 4:
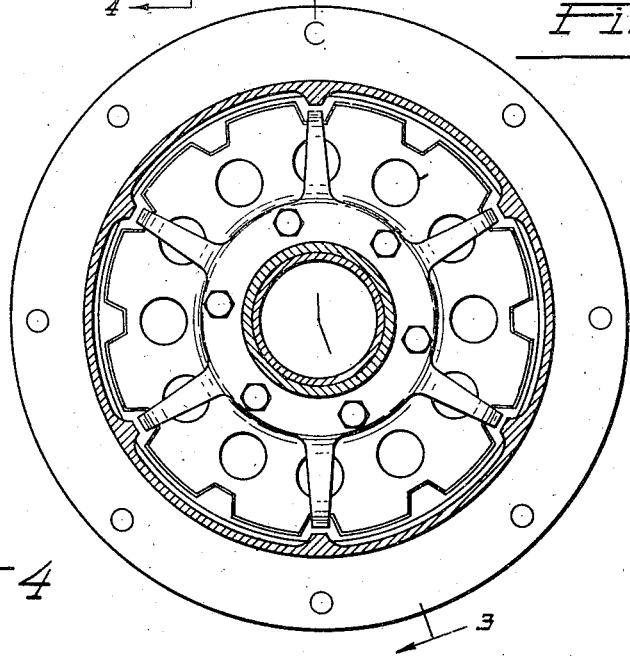
Fig. 4 is a sectional view taken on line 4—4 of Fig. 3.

A second embodiment of the invention is disclosed in Figs. 3 and 4 of the drawings and it will be seen that this modified structure differs from that of Figs. 1 and 2 in respect to the positioning and arrangement of the spring device which constantly operates on the fixed brake disc. In this embodiment the flat, inner part of the spring device is attached to the inner part 32 of the brake support 30, for example by clamping the inner peripheral part thereof which surrounds the axle 2 between the brake-support part 32 and a sleeve 70 which surrounds the axle. By reason of this positioning of the spring device with respect to the brake supporting device 30 the fingers of the spring device will not be extended through the apertures in the conical part 36 of the brake supporting device but will lie entirely on the inside of such conical part. In other respects the structure and operation of this embodiment of the invention are the same as those of the embodiment disclosed in Figs. 1 and 2.

In the operation of the described braking device, the spring fingers normally maintain the disc 38 in its inoperative position in which the friction face thereof is out of contact with the wheel-carried disc 20. If it is desired to stop rotation of the wheel, fluid under pressure is introduced into tube 60 through conduit 62, thereby causing the tube to expand and force disc 38 toward and into engagement with the wheel-carried disc 20 against the force of spring 46, thereby retarding or stopping the rotation of the wheel. The spring fingers provided in each embodiment of the invention yield to permit this movement of the fixed braking disc. Upon release of the pressure fluid the spring fingers will move the fixed brake disc 38 out of engagement with the rotatable disc 20, thereby stopping the braking action. In all such operations, the disc 38 is permitted only an axial movement into and out of engagement with the wheel-carried disc 20 and is held from rotary movement by the interengagement of the projections 40 and the apertures 42.

It will be seen that the fixed braking disc is supported on the lower axially-extending arm of the C-shaped device 34 only by the spring fingers, and that no other structural or other means need be provided for holding the fixed brake disc in desired position.

I have thus provided a disc braking device having a minimum number of parts which are of simple and cheap construction and which may be easily and quickly assembled and disassembled. While I have described and illustrated only two embodiments of my invention it will be apparent to those skilled in the art that other embodiments, as well as modifications of those disclosed, may be made without departing in any way from the spirit or scope of the invention, for the limits of which reference must be had to the appended claims.

What is claimed is:

1. A disc brake for a wheel assembly comprising an axle and a wheel journaled thereon, comprising an annular brake disc fixedly attached to the wheel, an annular brake supporting device comprising an inner part surrounding and attached to the axle, an outer part having an annular axially-extending surface, and an intermediate part integral with the inner and outer parts, a second annular brake disc mounted on said annular surface in spaced axial relation to said first disc, means preventing rotation of said second disc but permitting axial movement thereof toward and away from the first disc, a spring device having an inner part surrounding the axle and attached thereto and having a plurality of spring fingers extending radially outwardly therefrom and bearing at their outer ends against said second disc to constantly urge the same in a direction away from the first disc, and means for moving said second disc toward the first disc against the resilient force of said spring fingers.

2. A disc brake for a wheel assembly comprising an axle and a wheel journaled thereon, comprising an annular brake disc fixedly attached to the wheel, an annular brake supporting device comprising an inner part surrounding and attached to the axle, an outer part having an annular axially-extending surface, and an intermediate part integral with the inner and outer parts, a second annular brake disc mounted on said annular surface in spaced axial relation to said first disc, means preventing rotation of said second disc but permitting axial movement thereof toward and away from the first disc, a cup-shaped spring device having an inner part surrounding the axle and attached thereto and having a plurality of curved spring fingers extending radially outwardly therefrom and bearing at their outer ends against said second disc to constantly urge the same in a direction away from the first disc, and means for moving said second disc toward the first disc against the resilient force of said spring fingers.

3. A disc brake for a wheel assembly comprising an axle and a wheel journaled thereon, comprising an annular brake disc fixedly attached to the wheel, an annular brake supporting device comprising an inner part surrounding and attached to the axle, an outer part having an annular axially-extending surface having an annular series of apertures therein, and an intermediate part integral with the inner and outer parts, a second annular brake disc mounted on said annular surface in spaced axial relation to said first disc, said second disc having an annular series of spaced projections extending inwardly from the inner periphery thereof and respectively received in the apertures in the axially-extending surface of said outer part to prevent rotation of said second disc but permit axial movement thereof toward and away from the first disc, a spring device having an inner part surrounding the axle and attached thereto and having a plurality of spring fingers extending radially outwardly therefrom and bearing at their outer ends against said second disc to constantly urge the same in a direction away from the first disc, and means for moving said second disc toward the first disc against the resilient force of said spring fingers.

4. A disc brake for a wheel assembly comprising an axle and a wheel journaled thereon, comprising an annular brake disc fixedly attached to the wheel, an annular brake supporting device comprising an inner part surrounding and attached to the axle, an outer part having an annular axially-extending surface having an annular series of apertures therein, and an intermediate part integral with the inner and outer parts, a second annular brake disc mounted on said annular surface in spaced axial relation to said first disc, said second disc having an annular series of spaced projections extending inwardly from the inner periphery thereof and respectively received in the apertures in the axially-extending surface of said outer part to prevent rotation of said second disc but permit axial movement thereof toward and away from the first disc, a spring device having an inner part surrounding the axle and attached thereto and having a plurality of spring fingers extending radially outwardly therefrom and bearing at their outer ends against the side walls of the projections which extend inwardly from the inner periphery of the second disc to constantly urge said disc in a direction away from the first disc, and means for moving said second disc toward the first disc against the resilient force of said spring fingers.

5. A disc brake for a wheel assembly comprising an axle and a wheel journaled thereon, comprising an annular brake disc fixedly attached to the wheel, an annular brake supporting device comprising an inner part surrounding and attached to the axle, an outer part having an annular axially-extending surface, and an intermediate part of conical shape integral with the inner and outer parts and having an annular series of apertures therein, a second annular brake disc mounted on said annular surface in spaced axial relation to said first disc, means preventing rotation of said second disc but permitting axial movement thereof toward and away from the first disc, a spring device having an inner part surrounding the axle and attached thereto and having a plurality of spring fingers extending radially outwardly therefrom through the apertures in said conical part of the brake supporting device and bearing at their outer ends against said second disc to constantly urge the same in a direction away from the first disc, and means for moving said second disc toward the first disc against the resilient force of said spring fingers.

6. A disc brake for a wheel assembly comprising an axle and a wheel journaled thereon, comprising an annular brake disc fixedly attached to the wheel, an annular brake supporting device comprising an inner part surrounding and attached to the axle, an outer part of C-shaped cross-section the open face of which is opposite and spaced axially from said wheel-carried brake disc, and a conical intermediate part integral with both said outer and inner parts, a second annular disc positioned between the open face of said C-shaped outer part and said wheel-carried disc, means preventing rotation of said second disc but permitting axial movement thereof into and out of engagement with said wheel-carried disc, a spring device having an annular, inner part surrounding the axle and attached thereto and having a plurality of spring fingers extending radially outwardly therefrom and bearing at their outer ends against said second disc to constantly urge the same in a direction away from the wheel-carried disc, and means within said C-shaped part for moving said second disc toward the wheel-carried disc.

THOMAS BARISH.